(12) United States Patent
Berentsen et al.

(10) Patent No.: US 10,351,000 B2
(45) Date of Patent: Jul. 16, 2019

(54) INTELLIGENT VEHICLE FUEL GAUGE

(71) Applicant: International Business Machines Corporation, Armonk, NY (US)

(72) Inventors: Lambert S. Berentsen, Jonestown, TX (US); Gregory J. Boss, Saginaw, MI (US); James R. Kozloski, New Fairfield, CT (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/224,832

(22) Filed: Aug. 1, 2016

(65) Prior Publication Data

US 2018/0031405 A1 Feb. 1, 2018

(51) Int. Cl.
| | | |
|---|---|---|
| *B60K 15/03* | (2006.01) | |
| *B60K 35/00* | (2006.01) | |
| *B60W 50/00* | (2006.01) | |
| *B60W 50/14* | (2012.01) | |

(52) U.S. Cl.
CPC .............. *B60K 35/00* (2013.01); *B60K 15/03* (2013.01); *B60W 50/0097* (2013.01); *B60W 50/14* (2013.01); *B60K 2015/03217* (2013.01); *B60K 2350/1092* (2013.01); *B60K 2350/965* (2013.01); *B60W 2540/00* (2013.01); *B60W 2550/14* (2013.01); *B60W 2560/02* (2013.01); *Y02T 10/84* (2013.01)

(58) Field of Classification Search
CPC ................................................... G01F 23/0007
See application file for complete search history.

(56) References Cited

U.S. PATENT DOCUMENTS

| | | | |
|---|---|---|---|
| 7,538,662 | B2 | 5/2009 | Allmendinger |
| 7,693,651 | B2 | 4/2010 | Proefke et al. |
| 8,730,023 | B1 | 5/2014 | Kumar |
| 9,096,131 | B2 | 8/2015 | Nagara et al. |
| 2006/0266273 | A1 | 11/2006 | Westberg et al. |
| 2018/0266834 | A1* | 9/2018 | Cronin ............... B60H 1/00742 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Manuel A Rivera Vargas
(74) *Attorney, Agent, or Firm* — Law Office of Jim Boice

(57) ABSTRACT

In one or more embodiments of the present invention, one or more processors receive a fuel sensor reading from a fuel sensor on a vehicle. The processor(s) receive an environmental state of a route being taken by the vehicle to a destination and a biometric sensor reading that describes a biometric state of a driver of the vehicle. The processor(s) determine whether the remaining fuel will be sufficient for the vehicle to reach the destination subject to the constraints of the environmental state of the route being taken by the vehicle and the biometric state of the driver of the vehicle, and then modify an appearance of a fuel gauge on the vehicle based on whether the remaining fuel will be sufficient for the vehicle to reach the destination.

20 Claims, 7 Drawing Sheets

(56) References Cited

OTHER PUBLICATIONS

The Fuel Web, "E-Fuel Propane Tank Monitoring", www.thefuelweb.com, The Fuel Web, 2011, pp. 1-3.
Anonymous, "Intelligent Fuel Management System", IP.com, IPCOM000214455D, Jan. 30, 2012, pp. 1-4.
L. Case, "Fuel Gauges for Electric Vehicles", Automotive Industries, vol. 188, No. 2, 2009, pp. 42-43.
Anonymous, "Fuel Gauge", Android Apps on Google Play, play.google.com, Retrieved Aug. 1, 2016, pp. 1-3.

* cited by examiner

US 10,351,000 B2

INTELLIGENT VEHICLE FUEL GAUGE

BACKGROUND

The present disclosure relates to the field of vehicles, and particularly to fuel gauges for vehicles. Still more particularly, the present invention relates to an intelligent fuel gauge that modifies a fuel gauge display based on factors beyond the amount of remaining fuel.

SUMMARY

In one or more embodiments of the present invention, one or more processors receive a fuel sensor reading from a fuel sensor on a vehicle, where the fuel sensors describes an amount of remaining fuel in a fuel container on a vehicle. The processor(s) receive an environmental state of a route being taken by the vehicle to a destination. The processor(s) receive a biometric sensor reading that describes a biometric state of a driver of the vehicle. The processor(s) determine an amount of fuel that will be required by the vehicle to reach the destination subject to the constraints of the environmental state of the route being taken by the vehicle and the biometric state of the driver of the vehicle. The processor(s) determine whether the remaining fuel will be sufficient for the vehicle to reach the destination subject to the constraints of the environmental state of the route being taken by the vehicle and the biometric state of the driver of the vehicle. The processor(s) modify an appearance of a fuel gauge on the vehicle subject to the constraints of whether the remaining fuel will be sufficient for the vehicle to reach the destination based on the environmental state of the route being taken by the vehicle and the biometric state of the driver of the vehicle.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
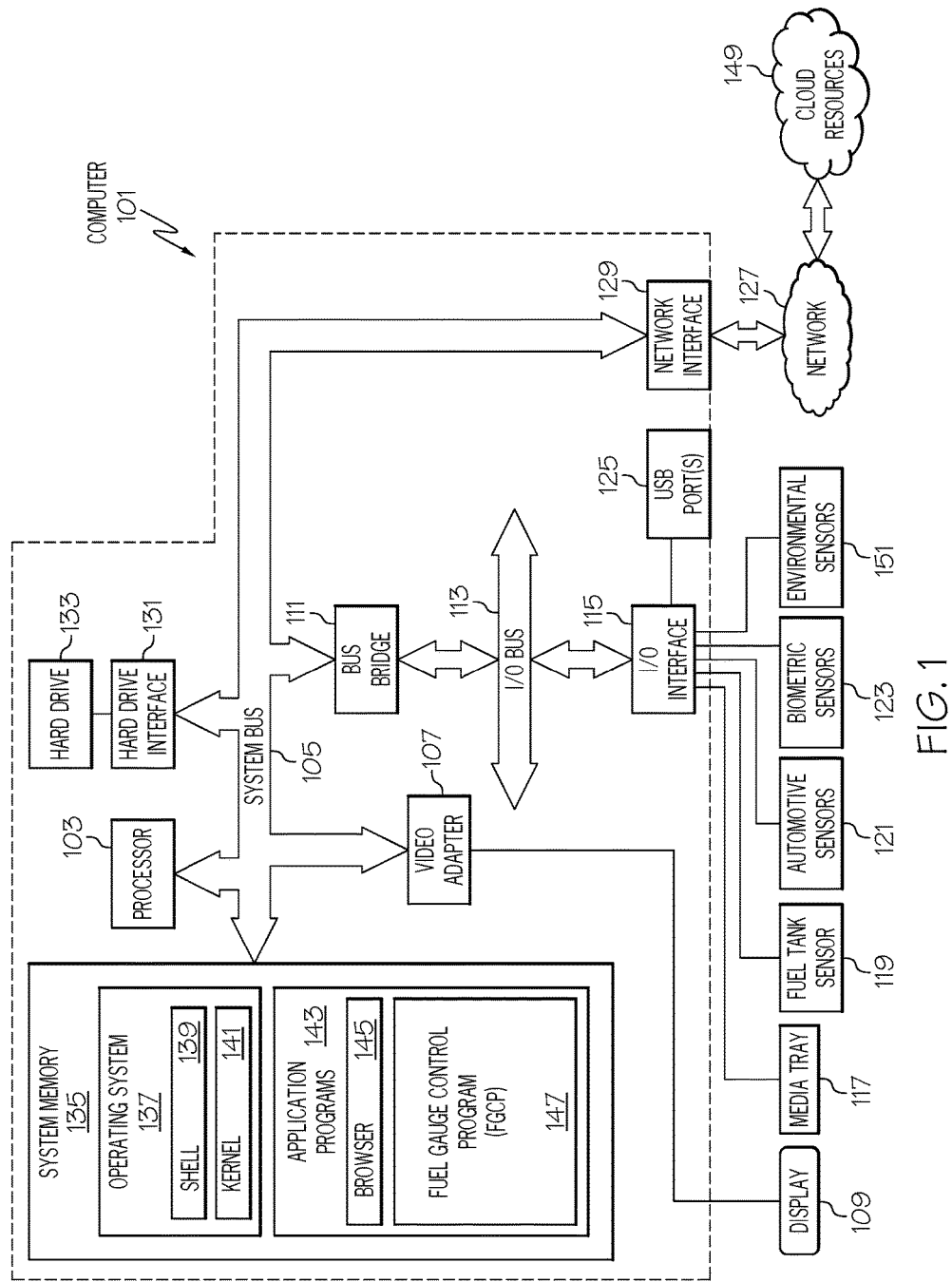
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software shown for and/or within computer 101, may be utilized by on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109, as well as a fuel gauge on a vehicle), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a media tray 117 (which may include storage devices such as CD-ROM drives, multi-media interfaces, etc.), a fuel reservoir sensor 119 (which detects the amount of liquid fuel in a gasoline tank, the amount of gas fuel in a fuel cell, the amount of stored electricity in a battery, etc.), a set of one or more automotive sensors 121 (e.g., heat and/or engine speed sensors that detect engine/motor heat in a vehicle, a speed of a vehicle, etc.), one or more biometric sensors 123 (e.g., eye scanners, body heat sensors, user-worn biometric sensors, etc. that detect eye focus, electrocardiograms, skin sweat, etc. for a driver of a vehicle), one or more environmental sensors 151 (e.g., cameras, thermometers, altimeter sensors, air pressure sensors, accelerometers, etc. that detect the condition of a route on which a vehicle is traveling), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with cloud resources 149 (e.g., a managing server that controls operations of an on-board computer on a vehicle) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Fuel Gauge Control Program (FGCL) 147. FGCL 147 includes code for implementing the processes described below, including those described in FIGS. 2-5.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention presents a vehicle gauge that indicates a quantitative measure of fuel on a vehicle coupled to an alerting mechanism (such as a light and/or sound). The fuel may be carbon-based (e.g., gasoline, diesel fuel, biofuel, hydrogen, etc. stored in a gas tank, a fuel cell, etc.) or electric (e.g., electricity stored in a battery). The alert is issued (e.g., a light is illuminated) as a function of not only the quantitative measure of the amount of available on-board fuel, but also other external inputs, such as a driver's calendar, a planned route, expected driving behavior, and a current cognitive model for the driver. The present invention provides a vehicle gauge that can be dynamically recalibrated to show a relative measure using the external inputs described herein.

Figure 2:
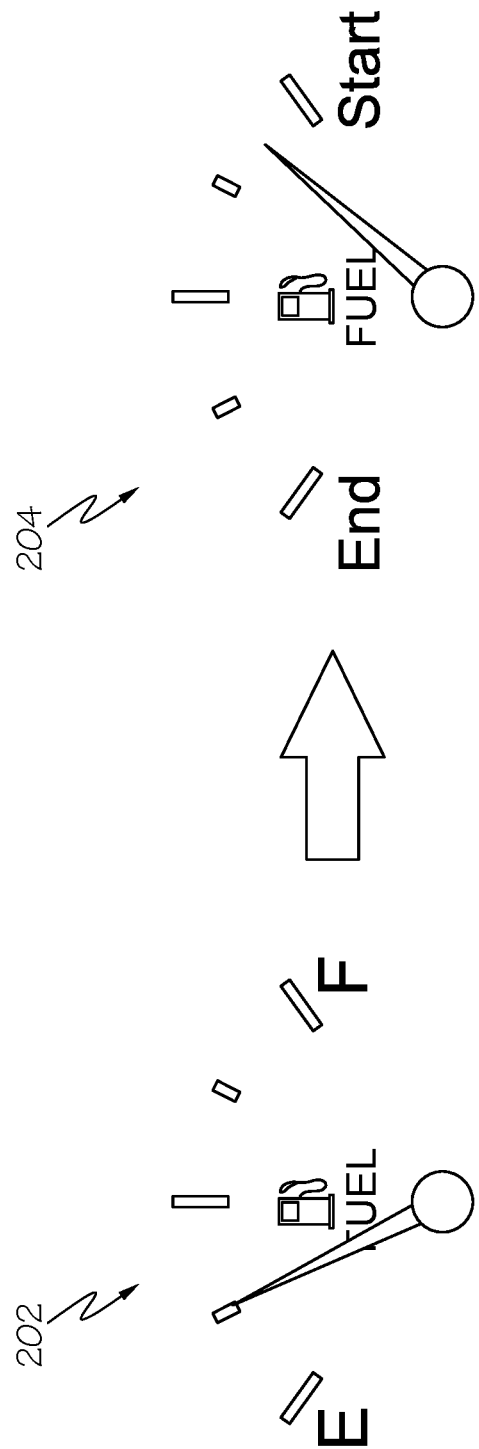
FIG. 2 illustrates a transformed fuel gauge in accordance with one or more embodiments of the present invention.

Vehicle gauges currently measure variable quantities of the vehicle state itself (e.g., gallons of gasoline, temperature of an engine block, etc.). For example, as shown in FIG. 2, a fuel gauge 202 shows the amount of gasoline (or diesel or electricity) available in a fuel tank (or battery) on a vehicle. As such, fuel gauge 202 provides a rudimentary alert to the driver regarding how much fuel is still on-board. However, fuel gauge 202 does not provide a level of cognitive alert based on other measures beyond the quantity itself (e.g., there is ¼ tank of fuel remaining). For example, it is more useful to have a fuel gauge such as fuel gauge 204 that informs the driver the state of reaching his/her destination based on factors beyond how much fuel is still on board.

Thus, the present invention lets the driver of a vehicle know if the vehicle will reach the desired destination by using all, more, or less of the ¼ tank of fuel. In one or more embodiments, the present invention warns the user at ¼ tank that they will need to fill up with gas rather than wait until the gauge is on empty. The present invention provides cognitive vehicle gauges that make use of external measures to provide a more context sensitive alerting to the vehicle operator.

That is, the present invention integrates additional influences to adjust the fuel gauge, such as engine factors (e.g., overheating), the driver's calendar, the planned route, expected driving behavior, and/or a current cognitive model of the driver. More specifically, the present invention does not merely predict how much farther a vehicle can travel based on 1) the amount of remaining fuel on-board and 2) the average miles per unit of fuel that the vehicle has achieved in the past, but rather determines the remaining range of a vehicle subject to the constraints of on 1) the amount of remaining fuel on-board, 2) the state of the upcoming roadway (e.g., uphill or level, gravel or paved, etc.), and 3) the state of the driver (e.g., anxious, calm, agitated, etc.).

Thus, the present invention allows drivers to plan accordingly to address vehicle variables based on their current cognitive and contextual needs.

The present invention alerts drivers to conditions in a more useful way than that of the prior art (e.g., alerts to vehicle conditions are variable based on external context and the driver's current emotional and cognitive state).

The present invention provides more useful vehicle gauges, which provide timelier and more relevant information than traditional gauges.

As described herein, in one or more embodiments an intelligent vehicle fuel gauge is imbued with a threshold for alerting the driver based on external inputs, such as the driver's cognitive state, environmental conditions, an amount of time available to reach a destination (e.g., as determined by the driver's calendar), etc. The intelligent fuel gauge is able to dynamically adjust minimum and maximum values (for when alerts should be provided to the driver) based on such external inputs.

In an embodiment of the present invention, an on-board computer (e.g., the on-board computer 301 shown in FIG. 3) measures some quantity (Q) of interest, such as the amount of fuel remaining on board. The computer also measures a vector of external inputs (I) such as a route, a calendar, and a cognitive state of the driver, and then computes a threshold $T(Q, I)$. If $Q<T$, then the system sends an alert to driver.

Figure 3:
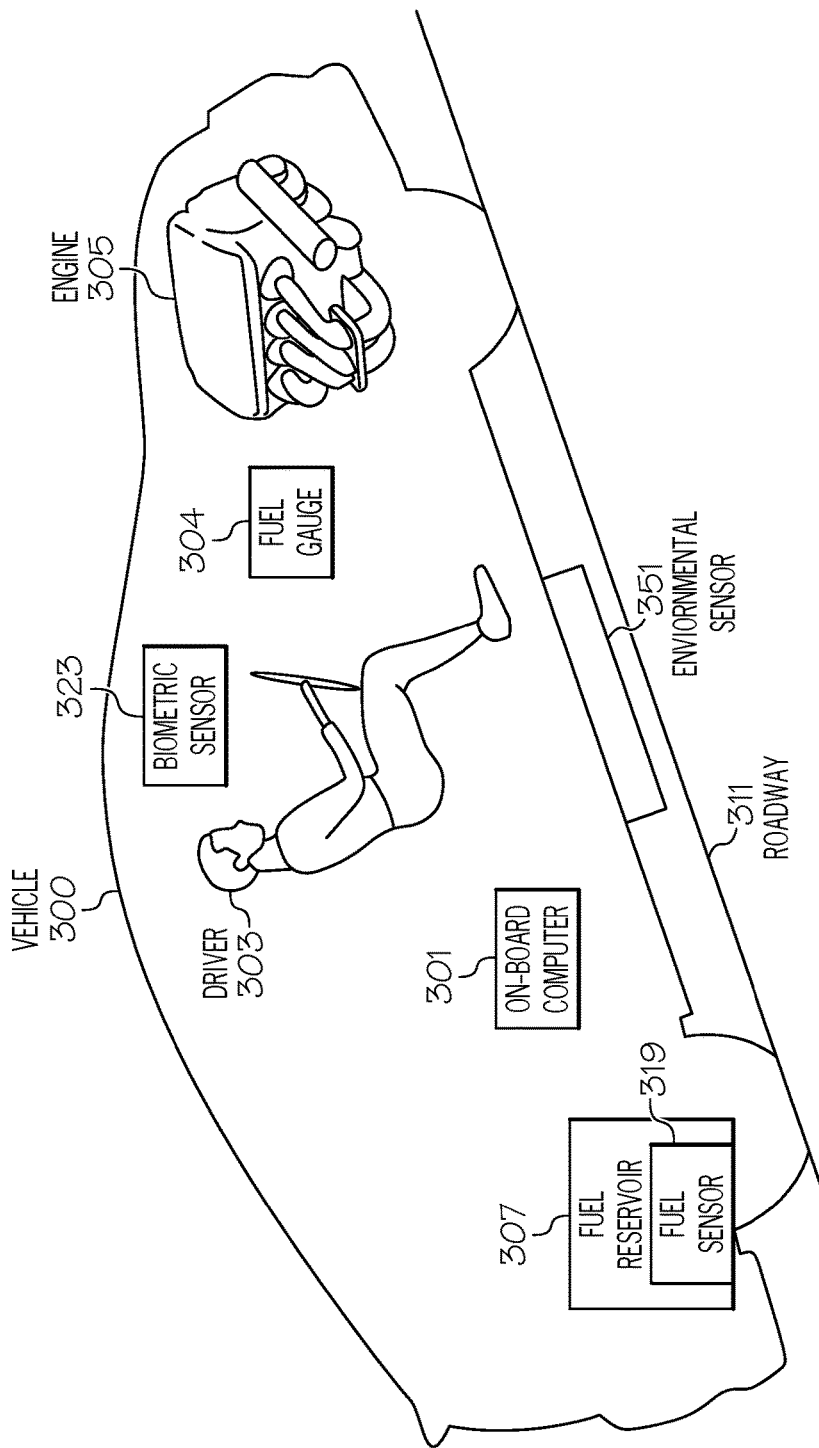
FIG. 3 depicts an exemplary vehicle traveling along a roadway in accordance with one or more embodiments of the present invention.

With reference now to FIG. 3, an exemplary vehicle 300 is depicted traveling along a roadway 311. Vehicle 300 has a driver 303, which controls an engine 305 (which may be an internal combustion engine or an electric motor), which is powered by fuel from a fuel reservoir 307, which may be a liquid storage tank for gasoline, diesel, etc., a fuel cell for storing hydrogen, etc., or a battery for storing electricity. Associated with (or inside of) the fuel reservoir 307 is a fuel sensor 319, which may be a mechanical float (in the case of liquid fuel stored in a liquid tank), a pressure gauge (in the case of a gas fuel such as hydrogen stored in a fuel cell), or a volt meter (in the case of electrical power stored in a battery).

The driver 303 is able to view a fuel gauge 304 (analogous to fuel gauge 204 shown in FIG. 2), which shows 1) how much fuel is available, 2) whether this is enough fuel to reach the vehicle's destination, and/or 3) any suggested alternatives for the driver/vehicle.

A biometric sensor 323 (analogous to biometric sensor 123 shown in FIG. 3) is able to detect various biometric factors for driver 303 in real time. For example, biometric sensor 323 may be an eye tracker that detects how often driver 303 is looking at fuel gauge 304. If driver 303 looks at fuel gauge 304 more than three times in five minutes (as suggested by an output from the biometric sensor 323), then the on-board computer 301 will determine that driver 303 is anxious, and will suggest the driver 303 pull into the next available fuel station, in order to reduce that stress level (even if more fuel is not needed to reach the planned destination that has been input into an on-board navigation system). Similarly, biometric sensor 323 may include biometric sensors that detect an increased heart rate, sweaty skin, foot tapping, finger tapping against the steering wheel, fidgeting, etc., all of which suggest anxiety, fatigue, etc., and thus the need for the driver 303 to pull into the nearest gas station in order to re-fuel the vehicle 300, thereby lessening his/her anxiety.

An environmental sensor 351 (analogous to the environmental sensor 151 shown in FIG. 1) detects conditions related to and/or external to vehicle 300. For example, environmental sensor 351 may detect engine overheating, bald tires, etc. (conditions related to vehicle 300), or roadway incline, snow/rain on roadway 311, curves in roadway 311, pavement type (asphalt, gravel, etc.) of roadway 311, etc.

Thus, if on-board computer 301 receives signals from environmental sensor 351 that engine 305 is overheating, then this will impact the range and/or speed of vehicle 300, since vehicle 300 will have to pull over in order to allow engine 305 to cool down.

If on-board computer 301 receives signals from environmental sensor 351 that show that roadway 311 is at an incline, is winding, has a loose surface (e.g., a gravel road), then the on-board computer 301 will determine that engine 305 will require more fuel from fuel reservoir 307 to reach a destination. As such, the fuel gauge 304 will adjust the amount of fuel needed (and/or available) to reach the destination.

While vehicle 300 is depicted as having a human driver, in one or more embodiments of the present invention vehicle 300 is a self-driving car (SDC), which is under the control of the on-board computer 301. As such, all alerts, recommendations, etc. that are described herein as being sent to the driver 303 are instead sent directly to the on-board computer 301, which adjusts the autonomous control systems (e.g., navigation systems, power systems, steering systems, etc.) of the vehicle 300.

Figure 4:
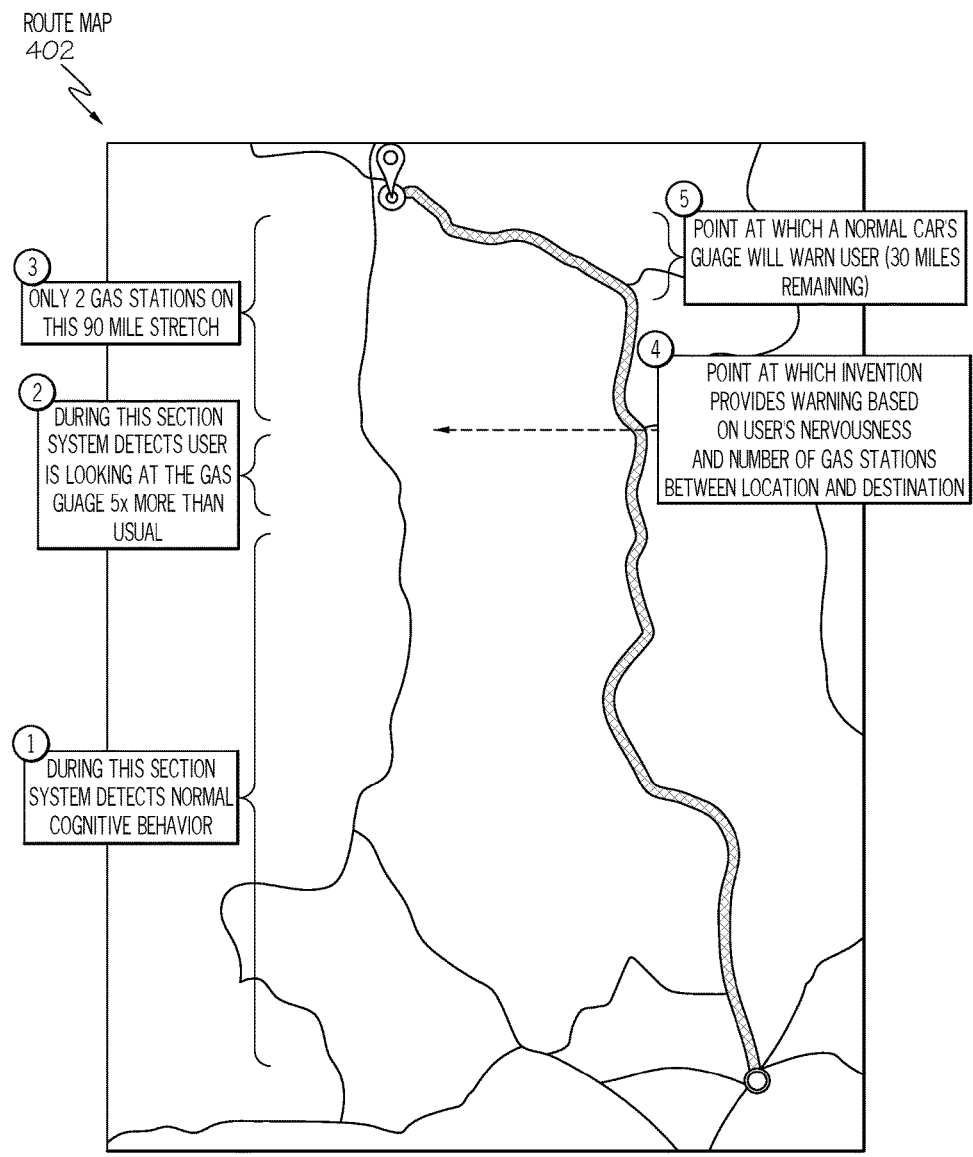
FIG. 4 illustrates an exemplary route map depicting various actions taken in accordance with one or more embodiments of the present invention.

With reference now to FIG. 4, an exemplary route map 402 depicting various actions taken in accordance with one or more embodiments of the present invention is presented. As shown at point 1 on route map 402, during this stretch of the route taken by the vehicle the driver is relaxed (as detected by biometric sensor 323 shown in FIG. 3). However, at point 2 on route map 402, the driver has started looking at the fuel gauge much more frequently, suggesting an increased state of anxiety. The on-board navigation system (e.g., part of on-board computer 301) determines that there are only 2 gas stations in the upcoming 90 miles of the planned route. As such, rather than wait until point 5 to let the driver know that he/she has only 30 miles worth of fuel remaining, the system will let the driver know at point 4 that there are 2 stations available, either of which are reachable, and either of which should be utilized by the driver in order to provide the (anxious) driver with assurance that he/she will not run out of fuel.

Figure 5:
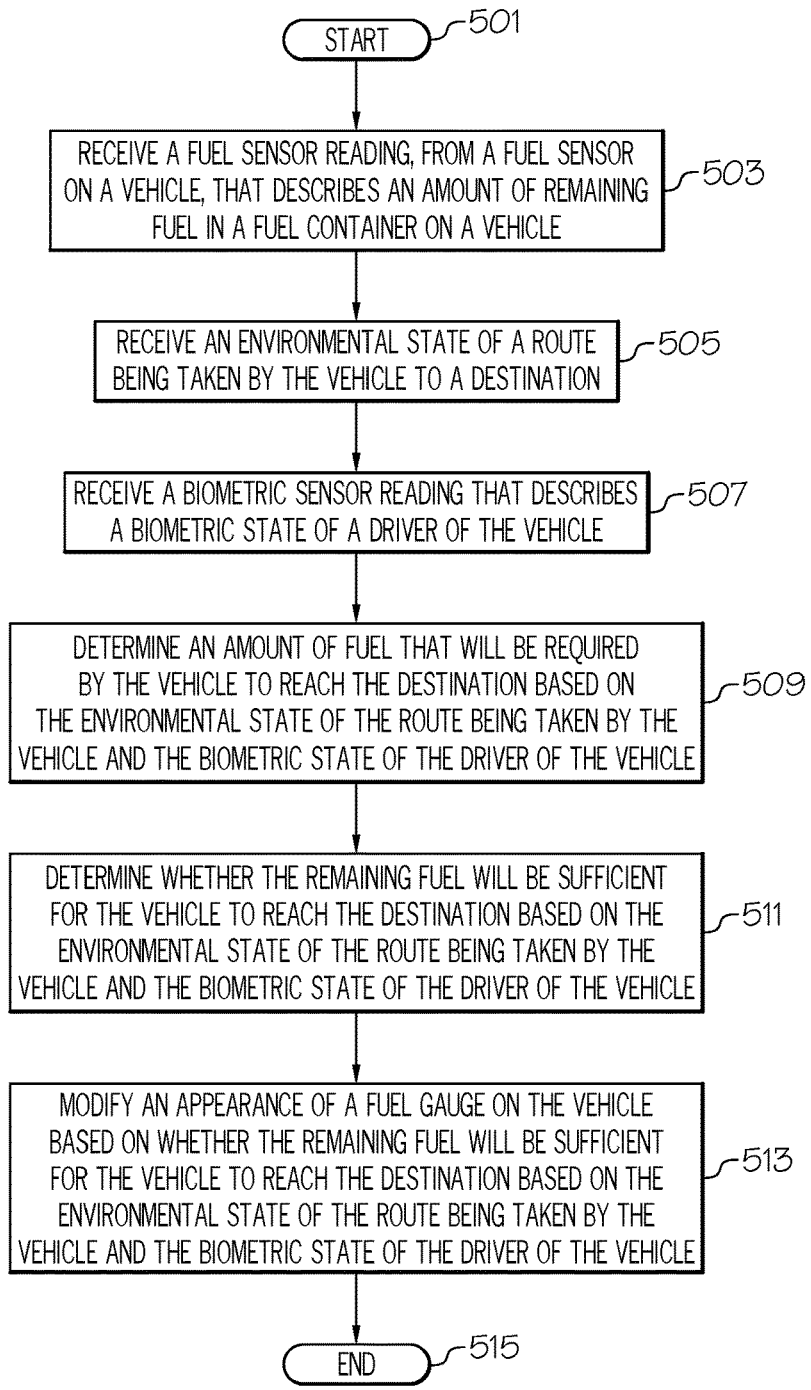
FIG. 5 is a high level flowchart of one or more steps performed by one or more processors and/or other hardware devices to adjust an intelligent fuel gauge in accordance with one or more embodiments of the present invention.

With regard now to FIG. 5, a high level flowchart of one or more steps performed by one or more processors and/or other hardware devices to adjust an intelligent fuel gauge in accordance with one or more embodiments of the present invention is presented.

After initiator block 501, one or more processors (e.g., within on-board computer 301 shown in FIG. 1 or within a remote computer that is part of cloud resources 149 shown in FIG. 1) receive a fuel sensor reading from a fuel sensor (e.g., fuel sensor 319 shown in FIG. 3) on a vehicle (e.g., vehicle 300 shown in FIG. 3), as described in block 503. The fuel sensor describes an amount of remaining fuel in a fuel reservoir (e.g., fuel reservoir 307 shown in FIG. 3) on the vehicle.

As described in block 505, one or more processors receive an environmental state of a route being taken by the vehicle to a destination. This environmental state may be weather related (e.g., snow, ice, rain), grade related (e.g., elevation incline), surface related (e.g., paved, gravel, dirt, etc.), etc.

As described in block 507, one or more processors receive a biometric sensor reading (e.g., form biometric sensor 323 shown in FIG. 3) that describes a biometric state of a driver of the vehicle, such as the driver's level of anxiety, etc.

As described in block 509, one or more processors determine an amount of fuel that will be required by the vehicle to reach the destination subject to the constraints of the environmental state of the route being taken by the vehicle and the biometric state of the driver of the vehicle. That is, the environmental state of the route affects how much fuel is needed (e.g., a snowy gravel road requires the vehicle to use more fuel than a dry paved road). The biometric state of the user also affects how much fuel is needed. For example, if the driver is determined to be in a highly agitated state, then he/she is likely to drive faster (e.g., to make a deadline), thus causing the engine 305 to use more fuel per mile. Similarly, if the driver is anxious or fatigued, then he/she is likely to use more fuel due to sudden braking, quick starts, etc.

As described in block 511, one or more processors determine whether the remaining fuel will be sufficient for the vehicle to reach the destination subject to the constraints of the environmental state of the route being taken by the vehicle and the biometric state of the driver of the vehicle.

As described in block 513, one or more processors modify an appearance of a fuel gauge (e.g., fuel gauge 304 shown in FIG. 3) on the vehicle based on whether the remaining fuel will be sufficient for the vehicle to reach the destination subject to the constraints of the environmental state of the route being taken by the vehicle and the biometric state of the driver of the vehicle. That is, the fuel gauge may move the fuel gauge needle closer to "Empty" is the system predicts that the vehicle 300 will use more fuel than expected, based on the driver condition and the roadway condition.

The flow chart ends at terminator block 515.

In an embodiment of the present invention, in response to determining that the remaining fuel is not sufficient for the vehicle to reach the destination, one or more processors will provide an alert to the driver of the vehicle. That is, not only will the fuel gauge needle move closer to empty, but the fuel gauge (or another warning device) will alert the driver 303 to the fact that there is not enough fuel remaining to get to the destination.

As such, the processor(s) will provide directions to a fuel supplier to the driver of the vehicle; and/or will provide alternate directions (e.g., that have been determined by the on-board computer 301 to use less fuel due to being shorter and/or due to having roadway conditions that cause the vehicle to use less fuel per mile) to the destination to the driver of the vehicle; etc.

In an embodiment of the present invention, one or more processors identify an amount of time available to reach the destination by a scheduled arrival time, where the scheduled arrival time is based on a calendar entry for a calendar used by the driver. The processor(s) determine an average vehicular speed that will be required to reach the destination by the scheduled arrival time. The processor(s) then further determine whether the remaining fuel will be sufficient for the vehicle to reach the destination based on the average vehicular speed that will be required to reach the destination by the scheduled arrival time. For example, the on-board computer 301 may interrogate an electronic calendar (e.g., stored in on-board computer 301 or retrieved from a smart phone carried by driver 303) for driver 303 shown in FIG. 3, and determine that there is only 20 minutes left to arrive at a destination for a meeting. However, if the driver 303 must travel above the speed limit or recklessly (e.g., weaving in and out of traffic while also braking hard, etc.), then the engine 305 will consume more fuel, which may exceed the amount of available fuel in the fuel reservoir 307 in the vehicle 300. As such, the fuel gauge 304 will show that the vehicle 300 will run out of fuel before reaching the destination (unless the driver drives slowly/normally). The fuel gauge 304 may provide this information (e.g., as a text message) to the driver 303, letting him/her know that unless he/she drives in a normal, safe manner, he/she will run out of fuel before reaching his/her destination.

In an embodiment of the present invention, the environmental state of the route includes a change in elevation that will occur between a current position of the vehicle and the destination of the vehicle. Thus, the on-board computer 301 will adjust the projected mileage of the vehicle 300 based on these changes in elevation (e.g., uphill, downhill).

In an embodiment of the present invention, the biometric sensor detects a frequency of viewing of the fuel gauge that is performed by the driver of the vehicle (e.g., once every five minutes or once every minute). In this embodiment, in response to determining that the biometric sensor determines that the driver has viewed the fuel gauge more than a predetermined number of times within a predefined time period (e.g., more than once every five minutes), the processor(s) direct the driver to a closest fuel supplier (as determined by an on-board navigation system that is part of on-board computer 301), thus relieving the driver's stress level (even if he/she didn't realize that he/she was getting anxious about the amount of fuel left in the fuel reservoir 307).

The following exemplary use cases describe various embodiments of the present invention:

Use Case 1: A gasoline gauge illuminates an alert by default when less than 4 gallons of gasoline remain in the tank. This threshold is dynamically adjusted based on the following inputs to an onboard alert optimization algorithm:

Expected route of driver and availability of gas stations along route.

Price of gasoline along route.

Calendar of driver and time available to stop for gas in the future.

Current and expected stress level due to gasoline level and potential alert.

Thus, the system adjusts its recommendation to the driver to stop for more fuel based on these factors.

Use Case 2: In an electric car, a battery gauge illuminates an alert by default when <10% battery charge remains. This threshold is adjusted based additionally on the following inputs to an onboard alert optimization algorithm:

Expected route of driver and availability of battery charging stations along route.

Price of battery charging along route.

Calendar of driver and time available to stop to charge battery in the future.

Current and expected stress level due to low battery level and potential alert.

Use Case 3: A hybrid vehicle (e.g., a pluggable hybrid vehicle) has a gasoline gauge and a battery gauge, in which the gasoline gauge illuminates an alert by default when less than 4 gallons of gasoline remain in the tank and the battery gauge illuminates an alert by default when <10% battery charge remains. These thresholds are dynamically adjusted based on the following inputs to an onboard alert optimization algorithm:

Expected route of driver and availability of gas stations and/or battery charging stations along route.

Price of gasoline and/or battery charging along route.

Calendar of driver and time available to stop for gas and/or battery charge in the future.

Current and expected stress level due to low gasoline level, low battery level, and potential alert.

Thus, the system adjusts its recommendation to the driver to stop for more fuel/battery charge based on these factors.

Use Case 4: A temperature gauge sounds an audio alert when the engine block reaches a temperature of 150° C. This threshold is adjusted based additionally on the following inputs to an onboard alert optimization algorithm:

Expected route of driver including terrain, elevation, grade, etc.

Towing mass.

Driving behavior.

Current and expected outside ambient temperatures which would contribute to the engine temperature.

Calendar of driver and time available to stop/modify driving behavior.

Thus, the system adjusts its recommendation to the driver to stop for more fuel based on these factors.

Use Case 5: A battery gauge measures battery life expectancy. The threshold is adjusted to reflect the likelihood the battery will fail and alert is sent accordingly. Inputs to an onboard alert optimization algorithm:

Size, Type and Capacity of battery (Cold Cranking Amps, Cranking Amps).

Age of battery.

Current level of charge.

Weather and temperature reports one week into the future.

Thus, the system adjusts its recommendation to the driver to stop for more fuel based on these factors.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
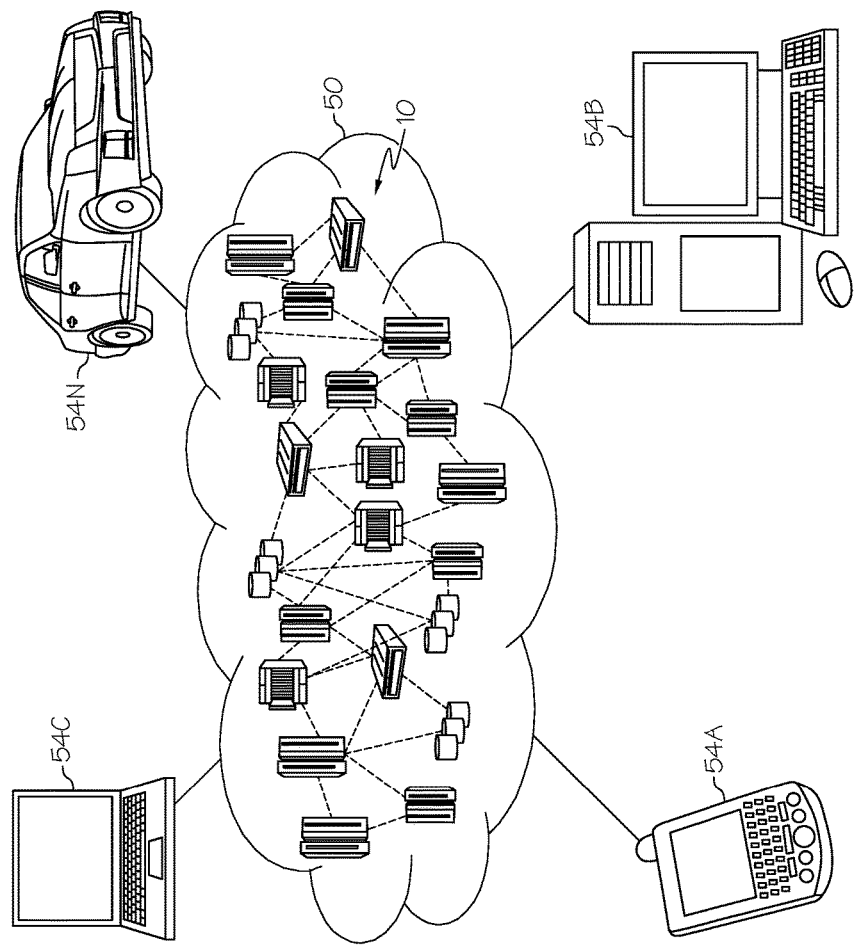
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
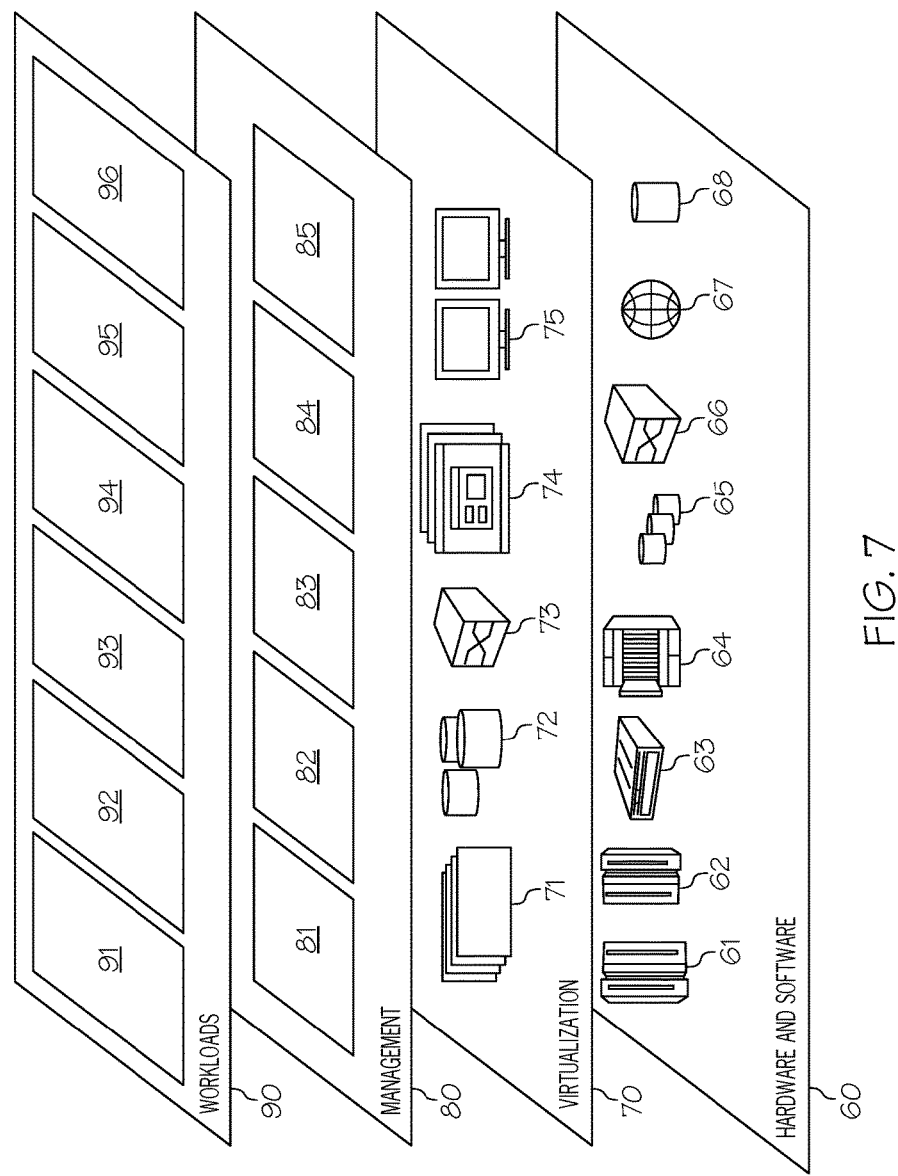
FIG. 7 depicts abstraction model layers of a cloud computing environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fuel gauge management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, a fuel sensor reading from a fuel sensor on a vehicle, wherein the fuel sensor describes an amount of remaining fuel in a fuel reservoir on a vehicle;
   receiving, by one or more processors, an environmental state of a route being taken by the vehicle to a destination;
   receiving, by one or more processors, a biometric sensor reading that describes a biometric state of a driver of the vehicle;
   determining, by one or more processors, an amount of fuel that will be required by the vehicle to reach the destination subject to constraints of the environmental state of the route being taken by the vehicle and the biometric state of the driver of the vehicle;
   determining, by one or more processors, whether the remaining fuel will be sufficient for the vehicle to reach the destination subject to the constraints of the environmental state of the route being taken by the vehicle and the biometric state of the driver of the vehicle; and
   modifying, by one or more processors, an appearance of a fuel gauge on the vehicle based on whether the remaining fuel will be sufficient for the vehicle to reach the destination subject to the constraints of the environmental state of the route being taken by the vehicle and the biometric state of the driver of the vehicle.

2. The method of claim 1, further comprising:
   in response to determining that the remaining fuel is not sufficient for the vehicle to reach the destination, providing, by one or more processors, an alert to the driver of the vehicle.

3. The method of claim 1, further comprising:
   in response to determining that the remaining fuel is not sufficient for the vehicle to reach the destination, providing, by one or more processors, directions to a fuel supplier to the driver of the vehicle, wherein the vehicle is a self-driving vehicle, wherein the driver is an on-board controller, and wherein the directions cause the self-driving vehicle to drive to the fuel supplier.

4. The method of claim 1, further comprising:
   in response to determining that the remaining fuel is not sufficient for the vehicle to reach the destination, providing, by one or more processors, alternate directions to the destination to the driver of the vehicle, wherein the vehicle is a self-driving vehicle, wherein the driver is an on-board controller, and wherein the alternate directions cause the self-driving vehicle to take an alternate route to the destination.

5. The method of claim 1, further comprising:
   identifying, by one or more processors, an amount of time available to reach the destination by a scheduled arrival time, wherein the scheduled arrival time is based on a calendar entry for a calendar used by the driver;
   determining, by one or more processors, an average vehicular speed that will be required to reach the destination by the scheduled arrival time; and
   further determining, by one or more processors, whether the remaining fuel will be sufficient for the vehicle to reach the destination based on the average vehicular speed that will be required to reach the destination by the scheduled arrival time.

6. The method of claim 1, wherein the environmental state of the route comprises a change in elevation that will occur between a current position of the vehicle and the destination of the vehicle.

7. The method of claim 1, wherein the biometric sensor detects a frequency of viewing of the fuel gauge that is performed by the driver of the vehicle, and wherein the method further comprises:
   in response to determining that the biometric sensor detects that the driver has viewed the fuel gauge more than a predetermined number of times within a predefined time period, directing, by one or more processors, the driver to a closest fuel supplier.

8. A computer program product comprising one or more computer readable storage mediums, and program instructions stored on at least one of the one or more computer readable storage mediums, the stored program instructions comprising:

program instructions to receive a fuel sensor reading from a fuel sensor on a vehicle, wherein the fuel sensor describes an amount of remaining fuel in a fuel reservoir on a vehicle;

program instructions to receive an environmental state of a route being taken by the vehicle to a destination;

program instructions to receive a biometric sensor reading that describes a biometric state of a driver of the vehicle;

program instructions to determine an amount of fuel that will be required by the vehicle to reach the destination subject to constraints of the environmental state of the route being taken by the vehicle and the biometric state of the driver of the vehicle;

program instructions to determine whether the remaining fuel will be sufficient for the vehicle to reach the destination subject to the constraints of the environmental state of the route being taken by the vehicle and the biometric state of the driver of the vehicle; and program instructions to modify an appearance of a fuel gauge on the vehicle based on whether the remaining fuel will be sufficient for the vehicle to reach the destination subject to the constraints of the environmental state of the route being taken by the vehicle and the biometric state of the driver of the vehicle.

9. The computer program product of claim 8, further comprising:
program instructions to, in response to determining that the remaining fuel is not sufficient for the vehicle to reach the destination, provide an alert to the driver of the vehicle.

10. The computer program product of claim 8, further comprising:
program instructions to, in response to determining that the remaining fuel is not sufficient for the vehicle to reach the destination, provide directions to a fuel supplier the driver of the vehicle.

11. The computer program product of claim 8, further comprising:
program instructions to, in response to determining that the remaining fuel is not sufficient for the vehicle to reach the destination, provide alternate directions to the destination to the driver of the vehicle.

12. The computer program product of claim 8, further comprising:
program instructions to identify an amount of time available to reach the destination by a scheduled arrival time, wherein the scheduled arrival time is based on a calendar entry for a calendar used by the driver;
program instructions to determine an average vehicular speed that will be required to reach the destination by the scheduled arrival time; and
program instructions to further determine whether the remaining fuel will be sufficient for the vehicle to reach the destination based on the average vehicular speed that will be required to reach the destination by the scheduled arrival time.

13. The computer program product of claim 8, wherein the environmental state of the route comprises a change in elevation that will occur between a current position of the vehicle and the destination of the vehicle.

14. The computer program product of claim 8, wherein the biometric sensor detects a frequency of viewing of the fuel gauge that is performed by the driver of the vehicle, and wherein the computer program product further comprises:
program instructions to, in response to determining that the biometric sensor detects that the driver has viewed the fuel gauge more than a predetermined number of times within a predefined time period, direct the driver to a closest fuel supplier.

15. The computer program product of claim 8, wherein the stored program instructions are provided from a cloud environment.

16. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to receive a fuel sensor reading from a fuel sensor on a vehicle, wherein the fuel sensor describes an amount of remaining fuel in a fuel reservoir on a vehicle;
program instructions to receive an environmental state of a route being taken by the vehicle to a destination;
program instructions to receive a biometric sensor reading that describes a biometric state of a driver of the vehicle;
program instructions to determine an amount of fuel that will be required by the vehicle to reach the destination subject to constraints of the environmental state of the route being taken by the vehicle and the biometric state of the driver of the vehicle;
program instructions to determine whether the remaining fuel will be sufficient for the vehicle to reach the destination subject to the constraints of the environmental state of the route being taken by the vehicle and the biometric state of the driver of the vehicle; and
program instructions to modify an appearance of a fuel gauge on the vehicle based on whether the remaining fuel will be sufficient for the vehicle to reach the destination subject to the constraints of the environmental state of the route being taken by the vehicle and the biometric state of the driver of the vehicle.

17. The computer system of claim 16, further comprising:
program instructions to, in response to determining that the remaining fuel is not sufficient for the vehicle to reach the destination, provide directions to a fuel supplier to the driver of the vehicle.

18. The computer system of claim 16, further comprising:
program instructions to, in response to determining that the remaining fuel is not sufficient for the vehicle to reach the destination, provide alternate directions to the destination to the driver of the vehicle.

19. The computer system of claim 16, further comprising:
program instructions to identify an amount of time available to reach the destination by a scheduled arrival time, wherein the scheduled arrival time is based on a calendar entry for a calendar used by the driver;
program instructions to determine an average vehicular speed that will be required to reach the destination by the scheduled arrival time; and
program instructions to further determine whether the remaining fuel will be sufficient for the vehicle to reach the destination based on the average vehicular speed that will be required to reach the destination by the scheduled arrival time.

20. The computer system of claim 16, wherein the biometric sensor detects a frequency of viewing of the fuel gauge that is performed by the driver of the vehicle, and wherein the computer system further comprises:

program instructions to, in response to determining that the biometric sensor detects that the driver has viewed the fuel gauge more than a predetermined number of times within a predefined time period, direct the driver to a closest fuel supplier.

* * * * *